US009050846B2

(12) United States Patent
Riper et al.

(10) Patent No.: US 9,050,846 B2
(45) Date of Patent: Jun. 9, 2015

(54) FINISHER OUTPUT DESTINATIONS

(71) Applicant: HEWLETT-PACKARD DEVELOPMENT COMPANY, L.P., Houston, TX (US)

(72) Inventors: Richard W. Riper, Sweet Home, OR (US); Jessica M. Jemmott, Columbus, OH (US); Anthony D. Studer, Albany, OR (US); Patrick J. Coven, Albany, OR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 135 days.

(21) Appl. No.: 13/852,907

(22) Filed: Mar. 28, 2013

(65) Prior Publication Data

US 2014/0297024 A1 Oct. 2, 2014

(51) Int. Cl.

| | |
|---|---|
| ***G06F 7/00*** | (2006.01) |
| ***B42C 1/12*** | (2006.01) |
| ***G03G 15/00*** | (2006.01) |
| ***G03G 21/16*** | (2006.01) |

(52) U.S. Cl.

CPC ............ *B42C 1/125* (2013.01); *G03G 15/6538* (2013.01); *G03G 15/6582* (2013.01); *G03G 21/1614* (2013.01)

(58) Field of Classification Search

CPC .................................................... G11B 17/225

USPC .......................................................... 700/214

See application file for complete search history.

(56) References Cited

U.S. PATENT DOCUMENTS

| | | | | |
|---|---|---|---|---|
| 4,811,048 | A * | 3/1989 | Ishikawa et al. | 399/408 |
| 5,133,539 | A | 7/1992 | Ishiguro et al. | |
| 5,524,873 | A | 6/1996 | Hosoi et al. | |
| 6,781,708 | B1 * | 8/2004 | Wada | 358/1.12 |
| 2002/0135121 | A1 | 9/2002 | Boss | |
| 2007/0160400 | A1 | 7/2007 | Hosoya et al. | |
| 2008/0304697 | A1 | 12/2008 | Rochards et al. | |
| 2009/0066999 | A1 * | 3/2009 | Ito | 358/1.15 |
| 2013/0144429 | A1 * | 6/2013 | Ragusa et al. | 700/224 |
| 2013/0242328 | A1 * | 9/2013 | Hyo | 358/1.13 |

OTHER PUBLICATIONS

Bourg Suction Tower—Bst-d , Feb. 8, 2009. <http://www.cpbourg.com/en/44/Bourg-Suction-Tower---BST-d/products/products.html?product_id=10>.

* cited by examiner

*Primary Examiner* — Gene Crawford

*Assistant Examiner* — Kyle Logan

(74) *Attorney, Agent, or Firm* — Hewlett-Packard Patent Department

(57) ABSTRACT

A finisher is to receive output. The finisher includes a plurality of destinations in which to store the output. A controller is to identify an operational history of the plurality of destinations, and direct the output to the plurality of destinations based on the operational history.

14 Claims, 8 Drawing Sheets

FINISHER OUTPUT DESTINATIONS

BACKGROUND

A finisher may include multiple receptacles or bins for receiving output from a printer. An operator may manually set how output should be handled, or the finisher may send output to bins using a default order. However, usage of the bins may result in the bins being subjected to unpredictable wear and breakdowns.

BRIEF DESCRIPTION OF THE DRAWINGS/FIGURES

DETAILED DESCRIPTION

A finisher may send output, such as printouts, book blocks, and other materials, to destinations (e.g., output bins) of the finisher to hold the output, e.g., for retrieval by an operator/user. For example, a finisher may include a "tower" of destinations to efficiently hold output using a minimum of floor space. Sending output to a destination may involve various motorized operations, including moving the destinations around to feed output to the destinations. The finisher may send a first output to a lowest available destination, and send the second output to the next lowest available destination, working its way up the available destinations. However, this brute force approach may lead to the lower destinations experiencing more wear than the upper destinations. Utilizing destinations of the finisher tower in the same order when distributing output may lead to uneven component wear, as each destination may not be fully utilized. Furthermore, the finisher may utilize destinations for storing output that are difficult for an operator to access or reach, including operators who may be disabled or otherwise associated with a reduced reach capability.

Examples provided herein may use a variety of techniques to feed output to the destinations, to meet various constraints including the needs of an operator. For example, a controller may spread out usage among the plurality of destinations, by tracking destination usage as part of an operational history, and sending output to the destinations equally to even out wear, prolonging component life. In an alternate example, the controller may favor centrally or other situated destinations, for an improved ergonomic interface for an operator. The controller may utilize destinations that are within the physical capabilities of the operator by avoiding destinations situated in the finisher that are outside a reach of the operator. The controller may enable certain destinations to be exclude from receiving output (e.g., locked out), for further customization of bin usage, even on a per-operator basis. Examples enhance the user experience, enable more predictable component wear, and may extend durations between servicing or replacement of the entire system. Destination usage may be tailored to best fit the capabilities and physical limitations of an operator.

Figure 1:
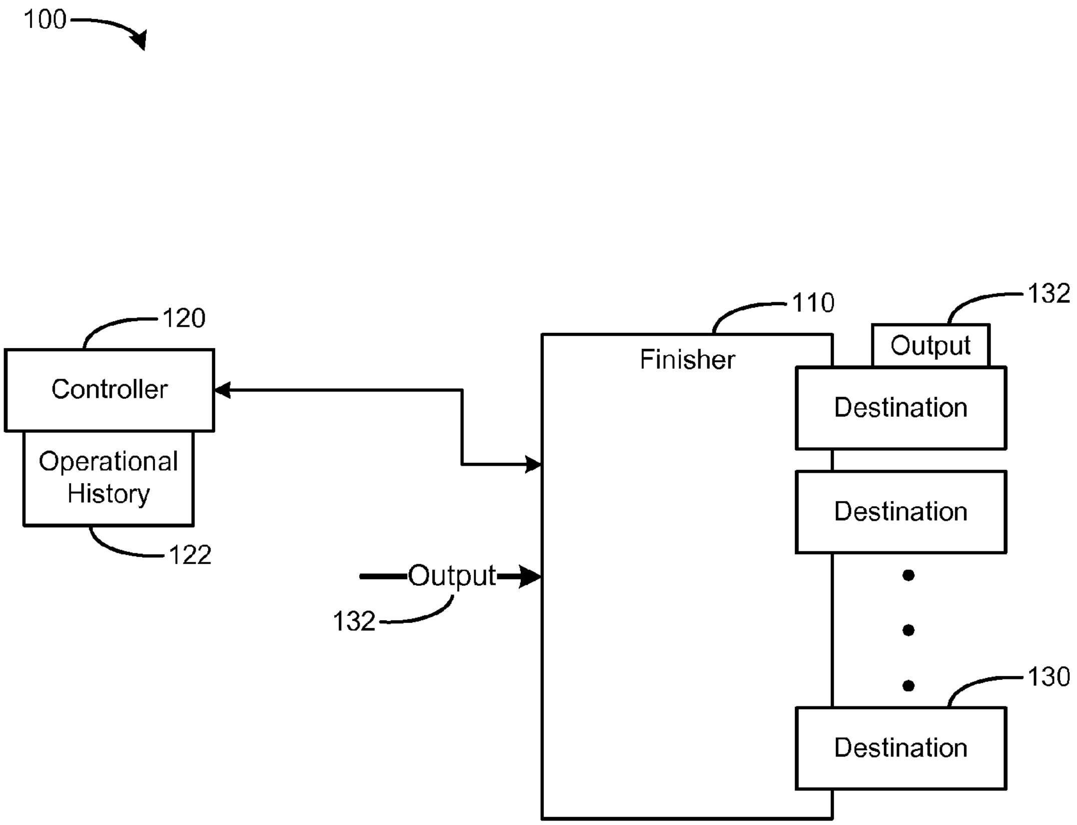
FIG. 1 is a block diagram of a system including a finisher and controller according to an example.

FIG. 1 is a block diagram of a system 100 including a finisher 110 and controller 120 according to an example. The finisher 110 is to receive output 132 (e.g., from a printer) and distribute the output 132 to a plurality of destinations 130. The controller 120 is to identify an operational history 122 associated with the finisher 110, and direct the output 132 based on the operational history 122.

The finisher 110 may be integrated with a printer or other source of output 132, or (as shown) provided separately from other system components. The finisher 110 may perform various types of post-processing of output 132, such as cutting, stapling, folding, binding book blocks, and other processing. Finisher 110 may be fully or semi-automated, operating according to different parameters to perform different finishing jobs, such as servicing a predetermined quantity of output 132 using a predetermined number of destinations 130 in a given job order timeframe, and so on.

Examples are compatible with various kinds of finishers 110, including those having multiple output destinations 130 (bins/receptacles) that are accessible by an operator (e.g., to retrieve output 132 to prevent the destination 130 from becoming too full, enabling additional output 132 to be received). Systems may include office copier environments, or various kinds of general purpose/industrial printers, or any machine (e.g., non-printers) having multiple compartments destinations 130 (including conveyor belts) that may present stacks of output to the operator. Example finishers 110 are not limited to a single dimension of vertically arranged destinations. Examples may include horizontally arranged sections, including multiple conveyor belts to provide stacks of output 132, including a horizontal matrix as well as a vertical matrix arrangement. The finisher 110 may provide the output 132 to the destinations 130 under the direction of the controller 120.

The controller 120 is shown in FIG. 1 as physically separate from, and coupled to, the finisher 110. However, in alternate examples, the controller 120 may be located physically in the finisher 110, in a printer or other source of output 132 (not shown in FIG. 1), and/or located remotely such as in a cloud environment or other virtualization. The controller 120 may be coupled via a networking connection or other interface to enable the controller 120 to adjust behavior of the finisher 110 and/or a printer. Functionality of the controller 120 may be resident in the finisher 110, including an integrated printer and finisher system. Example functionality may be enabled by being installed as software on hardware (finisher 110, separate computer, and/or printer), or on a server or computer in network communication with the finisher 110. The controller 120 may be associated with operational history 122.

Operational history 122 may be used to track usage of the destinations 130 of the finisher 110 over time. For example, the operational history 122 may indicate when even a single sheet of paper output 132 is directed to a destination 130. The operational history 122 may enable the controller 120 to perform usage tracking of at least one of the destinations 130, and send output 132 to the destinations in such a way as to even out component wear, for example. The system 100 also may better predict when components have worn to where they may need replacement. This may allow the controller 120 to suggest scheduled maintenance on a preemptive basis prior to failure, rather than waiting for an operator to deal with actual component failure and associated down time if a component were to fail.

More specifically, the controller 120 having access to how destinations 130 have been utilized over time (based on the operational history 122) enables notification of a potential need for preventative maintenance, for those destinations 130 that may be most worn out. In an example, some combination of usage patterns may potentially create a situation where a certain number of destinations were used heavily, whereas other destinations received light use. The controller 120 may watch for that type of situation, and address those heavily used destinations for maintenance in a preventative fashion, rather than waiting for them to fail and need to shut down the entire system (e.g., including an industrial printer or other component that suffers downsides from being shut down or subjected to other forms of stoppage). Further, the controller 120 may notify users by suggesting some alternate usage patterns (e.g., different weighting of destination usage or other techniques) to better manage wear of the various components.

The controller 120 may include information regarding various components, such as the number of uses (e.g., one million cycles) a component may perform on average before a failure (e.g., mean time before failure, (MTBF), or end of life (EOL) estimations). Thus, the controller 120 may use the operational history 122 and other component information to track destination usage (e.g., total number of hours used) and compare that to the EOL or other information, to estimate whether a destination 130 is being relatively over-used. The controller 120 may take action, including presenting a notification warning, or determining that other destinations 130 are available to be used in preference to those destinations 130 that are nearer their EOL.

The controller 120 also may allow an operator to customize which destinations to use. For example, favoring centrally situated destinations, or those at a more ergonomic height for an operator, or allowing an operator to "lock out" specified destinations that are beyond the operator's physical capabilities. As an example, a wheelchair-bound operator could lock out the upper destinations 130.

Figure 2:
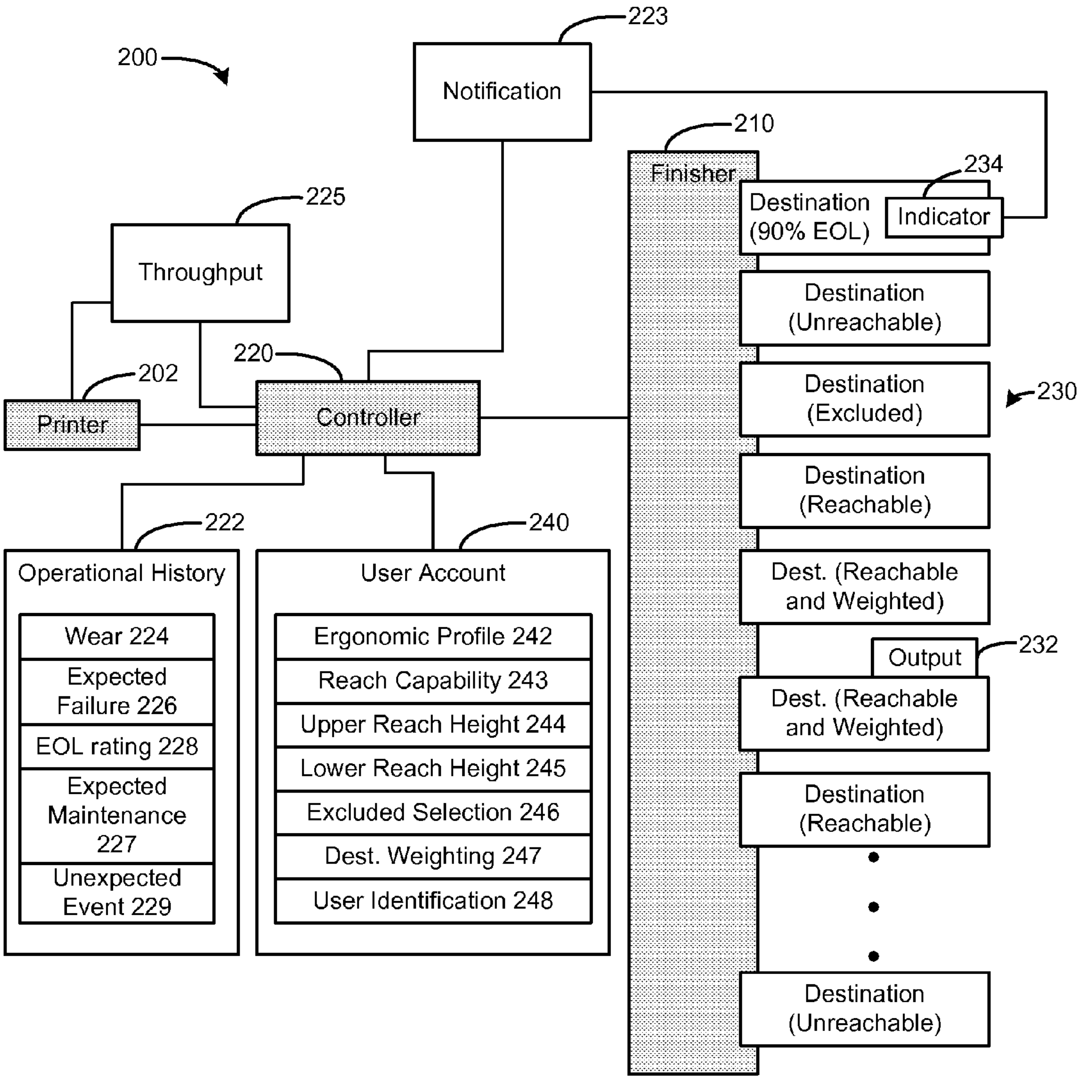
FIG. 2 is a block diagram of a system including a finisher and controller according to an example.

FIG. 2 is a block diagram of a system 200 including a finisher 210 and controller 220 according to an example. The finisher 210 includes a plurality of destinations 230 to receive output 232, and at least one destination may include an indicator 234. Although specifically shown on destination 230, an indicator 234 may be at other locations of the system 200, such as on a housing of the finisher 210, a control interface, a printer, a computer, or elsewhere. The controller 220 is to direct the output 232 to the destinations 230, and may be coupled to a printer 202 and the finisher 210. The controller 220 may provide notifications 223, and may provide instructions such as throughput 225 usable by the printer 202 and/or the finisher 210. The controller 220 may direct the output 232 to the destinations 230 based on operational history 222 and user account 240. The operational history 222 may include wear 224, expected failure 226, end-of-life (EOL) rating 228, expected maintenance 227, and unexpected event 229. The user account 240 may include ergonomic profile 242, reach capability 243, upper reach height 244, lower reach height 245, excluded selection 246, destination weighting 247, and user identification 248. The information accessible by the controller 220, including operational history 222, user account 240, and others, may be stored in a database or other data storage externally or internally to the controller 220 (e.g., within controller registers).

Customizations of usage of the destinations 230, such as a setup profile, may be tied to operators through the use of the user account 240 and the use of user identification 248 corresponding to an operator. If an operator, or group of operators, logged in to system 200, the controller 220 could automatically configure finisher 210 with an optimum profile to set up the destinations 230 for that configuration of multiple users, beyond merely optimizing output in view of a single constraint. For example, an operator may begin his or her operational shift with the system 200, and log onto the system 200 using user identification 248 such as a login account, identification (ID) card, or other ID. The controller 220 may recognize that the operator is an operator in a wheel chair, who may be capable of reaching the destinations situated vertically toward a middle of the finisher 210. Ergonomic profile 242 may include reach information (upper and lower reach heights 244, 245), and other information of the user, such as which destinations to exclude/lockout (excluded selection 246) and how to weight potential usage different destinations (destination weighting 247). Therefore, destinations that are physically unreachable by a user may be excluded from receiving output 232 (e.g., "locked out"). A tall second user may have a preference for upper destinations 230, so the controller 220 may additionally weight the upper destinations 230 (e.g., those still within a reach of the first user) to enable beneficial usage for both users simultaneously. The user account 240 enables these and other enhancements to be available by the controller 220 directing the output 232.

Usage of the destinations 230 may be affected by additional aspects of operational history 222, such as expected maintenance 227 and unexpected event 229. Output 232 may be directed to the destinations 230 in view of whether that destination will be serviced (e.g. receiving maintenance) in the future, and how far into the future (e.g., an expected additional hours of operation until maintenance/replacement). For example, the controller 220 may identify that future maintenance for a destination 230 has been scheduled, e.g., to overhaul or replace that destination 230. Accordingly, the controller 220 may direct additional output 232 to that destination 230 that is going to be replaced, to reduce wear and tear on other destinations 230 (e.g., those not scheduled to be replaced). The controller 220 also may be less conservative in locking out that destination 220, because the scheduled maintenance may occur before a determined expected failure, enabling more liberal use of that destination, compared to what the usage would have been if just using the determination of expected failure 226 or EOL rating 228 or other factors that may be used to prolong expected failure. The controller 220 also may monitor unexpected events 229 associated with a destination 230, and output 232 may be directed to the destination 230 based on whether a number of unexpected events 229 exceeds a threshold (including whether the threshold is met within a period of time). For example, the controller 220 may identify repeated jamming events or other issues (e.g., intermittent recoverable failures) within a time period, e.g., 6 hours. The controller 220 may identify that the occurrence of such issues exceeds a threshold number (which may include monitoring the threshold within a window of time), and adjust usage of that destination 230 (including locking it out or adjusting weighting of it or other action). Furthermore, monitoring of unexpected events 229 may be used to adjust an expected failure 226 for a destination 230. For example, a jamming event may be found to correlate typically with a reduction of 100 hours of EOL rating 228.

The destinations 230 may be customized by the controller 220, e.g., as shown in FIG. 2 for use in receiving output 232. For example, a first (top-most) destination 230 may be determined by the controller 220 to be at a 90% of its EOL rating. Thus, the controller 220 may provide a notification 223 (e.g., a preventive maintenance notification) and associated indicator 234 identifying that the first destination 230 is approaching a (e.g., 90%) EOL status. Such a destination may be selectively disabled, such as by gradually de-weighting use of the first destination 230 to minimize its use, including suspending or locking out the destination as it approaches, reaches, and/or exceeds its EOL rating. A second destination 230 is shown as unreachable, e.g., outside a reach capability of the user's ergonomic profile 242. The third destination 230 is shown as excluded, e.g., locked out from being used for output 232. The fourth destination 230 is shown as reachable, e.g., within an ergonomic profile 242 including a reach capability 243 of the user. The fifth destination 230 is shown as reachable and weighted, e.g., located at a user desirable position to thereby desire additional output to be sent (weighted), compared to other negatively weighted (and/or non-weighted) destinations 230. The sixth destination 230 is similarly shown as reachable and weighted, and has received the output 232 which is awaiting pickup in the sixth destination 230. The seventh destination 230 is shown as reachable, but because it is unweighted, output 232 has a reduced likelihood of being directed to the seventh destination 230. The final destination 230 is shown as unreachable, which may be due to being too low for a user to reach. In alternate examples, additional or fewer destinations 230 may be used, and examples are not limited to the number of destinations 230 specifically shown in the figures.

The controller 220 may provide instructions regarding throughput 225. Throughput 225 may be used to control a rate or speed of processing output 232, and may be applicable to the finisher 210 and/or the printer 202 (or any other component that may serve as a bottle-neck or otherwise affect throughput of other components of the total system 200, including computational resources such as cloud processing services). In an example, if the finisher 210 were capable of operating at a higher speed (i.e., had upside speed due to not needing to use all of its destinations 230 during use by a particular operator/user identification 248), the controller 220 may provide a throughput 225 instruction to the finisher 210 to increase its throughput speed until that operator logs off. The controller 220 may instruct the throughput of the finisher 210 to follow a throughput of the printer 202, such that the finisher 210 would receive the output 232 pushed by the printer. Accordingly, the controller 220 also may provide a throughput 228 instruction receivable by the printer 202, to adjust a printer speed/throughput, which throughput rate the finisher 210 may also follow.

In addition to the concepts above, regarding adjusting throughput speed for its own sake (increased or decreased), throughput also may be decreased to provide a more reliable steady state system operation, to better match a number of available output destinations 230. More specifically, it is possible for the controller 220 to slow down a throughput 228 of the printer 202 and/or finisher 210 to better ensure the system 200 may keep running constantly, instead of starting and stopping in spurts of operation. Automated machines in particular may run advantageously in a steady-state mode, even if it is slower, by avoiding an interrupted start/stop operational pattern. This may seem counter intuitive, to slow down throughput 225 to achieve more efficient and possibly greater overall system output 232. However, the possibility of running system 200 unattended for a long period of time may depend on the number of available destinations 230 for storing output 232. For example, a larger number of destinations 230 enables a longer duration of unattended operation, because the operator does not need to pull output 232 from the destinations 230 as frequently because the numerous destinations in total will fill up less frequently, compared to using fewer destinations. Thus, if some destinations 230 are not being used (e.g., an operator prefers not to use all the destinations 230), the remaining destinations 230 would fill up relatively more quickly. Accordingly, the controller 220 may slow down the printer 202 and/or the finisher 210 to satisfy any need to run unattended for a given period of time. By slowing down the whole system 200, the controller 220 actually may run the system 200 more efficiently by avoiding stoppage and restarting of system 200.

Thus, not only may controller 220 incorporate information regarding user account 240 and/or operational history 222; the controller also may incorporate knowledge about various parameters regarding the overall system 200 (e.g., finisher 210, destinations 230, printer 202, etc.). For example, the controller 220 may understand how to vary throughput 225 and other factors, in view of a number of destinations 230 available for a given usage scenario, and how to vary throughput 225 to stretch out a given print run or other operation involving output 232 to the destinations 230. Changes may include, e.g., increasing speed of the finisher 210, and/or decreasing a speed of the printer 202, so that the system 200 may keep running in more of a steady-state mode and avoid frequent changes in acceleration/deceleration, thereby reducing component wear (in addition to avoiding stoppage). Additionally, by running in steady-state mode, wastage of materials may be avoided. For example, in a system 200 including a roll-fed press or other large-scale industrial machine, start-up of a roll-fed press may involve generation of large amounts of waste paper before even producing the user content to be sent as output 232 to the finisher 210. Thus, unlike with sheet-feed processes that may be seen in an office printer or home environment, avoiding starting/stopping system 200 may also avoid substantial waste in industrial environments where output 232 is produced for finisher 210.

The various components of system 200 may be implemented as shown, and also may be varied. For example, notification 223 may be provided electronically, including generated as a message sent remotely via network to/from the controller 220, printer 202, finisher 210, and/or destination 230. Notification 223 may be provided locally, on machine hardware, similar to a “low-toner” message displayed on a printer's control panel in need of a new toner cartridge. The notification 223 may address maintenance issues (e.g., a preventive maintenance notification), and also may be about managing users and notifying them about their preferences, options, and settings applied to the destinations 230. For example, the notification 223 may be a lockout (excluded) notification, a weighted notification, a reachable notification, an unreachable notification, or other notifications. In an industrial example, automated print systems and equipment may have a hardware light tree pole (not shown) or other human machine interface (HMI) system having several different indicators to flash or show different colors for indicating system status of the machine based on notification 223. In an office environment, a local message and/or network notification may be more appropriate. The notifications 223 generated by the controller 220 may be provided by various indicators 234.

An indicator may be provided as a physical indicator, to indicate a notification 223 for destination status, including locked-out, nearing EOL, at EOL, exceeded EOL, currently available, currently active/in-use, currently unavailable, and other status indicators described above. The indicator 234 also may be various electronic notifications, such as a pop-up networking, email, or chat message sent to a user. The indicator 234 is shown located on the destination 230. However, the physical location of the indicator 234 may be anywhere on the system 200, and also remotely from the system 200 (e.g., a cloud-generated and displayed indicator).

The indicator 234 may be a multicolor light-emitting diode (LED) for indicating different statuses using a single physical LED. The status of the indicator 234 may be varied, in addition to its color, such as indicating a steady solid color, or flashing a single color, or alternating and/or mixing multiple colors. Custom-designed LEDs may be used, e.g., using custom dwells to achieve a larger indication for viewability from farther away. In addition to visual based indicators 234, other types of indicators 234 may be used, including audio-based indicators (e.g., bells, buzzers, beepers, etc.) or other non-visual indicators (vibrators).

Figure 3:
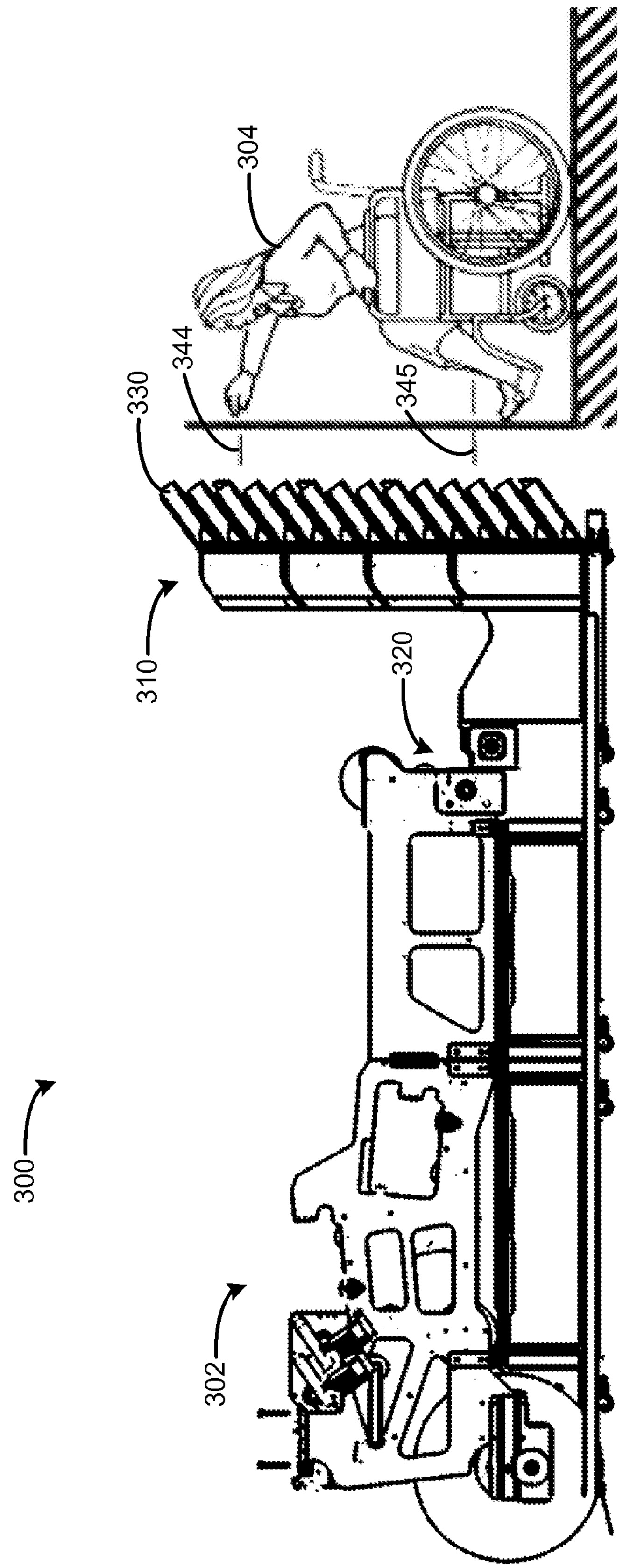
FIG. 3 is a block diagram of a system including a printer, finisher and controller according to an example.

FIG. 3 is a block diagram of a system 300 including a printer 302, finisher 310, and controller 320 according to an example. An operator/user 304 is shown interacting with the finisher 310, and an upper reach height 344 and lower reach height 345 are shown for that user 304.

The printer shown is a roll-fed duplex industrial printer, primarily for creating books. However, the finisher 310 may be used to stack any type of sheeted output in each destination 330. Note that external coverings have been removed from the printer 302 to show its mechanisms. The printer 302 may include print heads, an in-feed roll of paper, an off-axis ink supply station, and a sheeter to take printed output and cut it into sheets that are directed into the finisher 310, among other components.

The finisher 310 is shown with external covers on, and may include a reject bin (not shown) among the various destinations 330. The finisher 310 includes a feed path from a lower portion to feed output throughout the various destinations 330. Output, such as print jobs (stacks of finished output ready for removal), may accumulate in the destinations 330 for removal by the operator/user 304.

As shown, the user 304 has an upper reach height 344 and a lower reach height 345. However, the finisher 310 includes destinations 330 beyond the reach of the user 304. Thus, example systems 300 may enable the user 304 to ensure that output is provided at destinations 330 compatible with an ergonomic profile of the user 304. Without such example techniques, the finisher 330 may use a rudimentary approach of directing output to the lowest available destinations 330 as they continue filling up, inconveniencing the user 304 and causing undue wear on the finisher 310.

Thus, the controller 320 may be customized with a particular ergonomic profile of a user 304. However, benchmark customizations also may be used. For example, a typical disability ergonomic profile may be used, based on information taken from the Americans with Disabilities Act Accessibility Guidelines for Buildings and Facilities (ADAAG), or guidelines from the Centre for Excellence in Universal Design, among other guidelines for establishing ergonomic preferences for various users 304.

Referring to FIGS. 4-8, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

Figure 4:
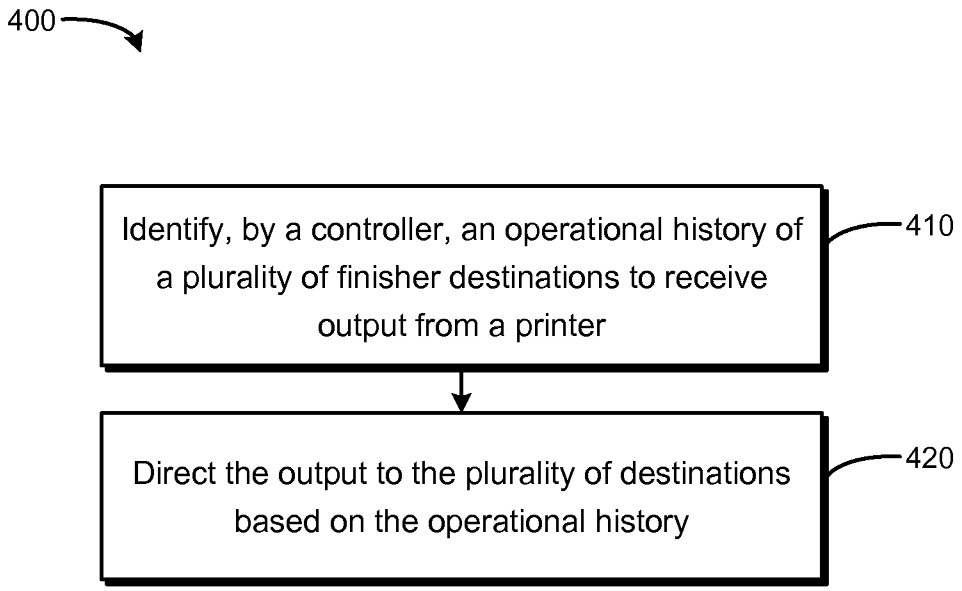
FIG. 4 is a flow chart based on directing output to destinations according to an example.

FIG. 4 is a flow chart 400 based on directing output to destinations according to an example. In block 410, a controller is to identify an operational history of a plurality of finisher destinations to receive output from a printer. For example, the controller may track accumulated hours of usage on a per-destination basis. In block 420, the output is directed to the plurality of destinations based on the operational history. For example, the output may be distributed across the various destinations to even-out the accumulated hours of usage of each destination and minimize unbalanced wear and tear across the plurality of destinations.

Figure 5:
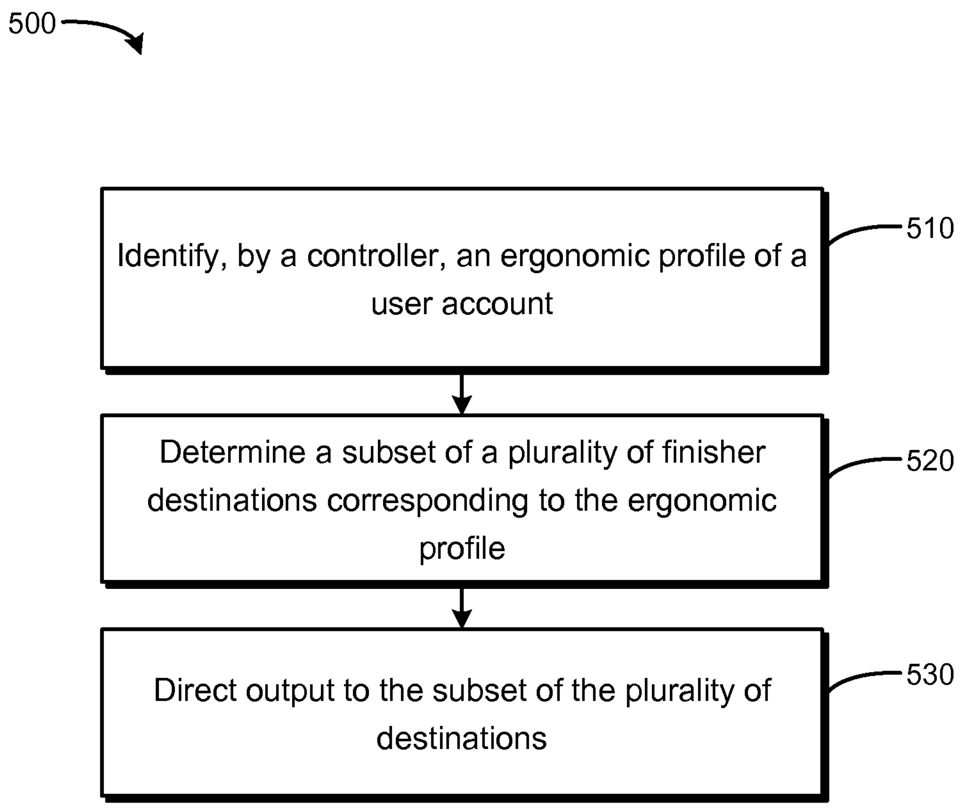
FIG. 5 is a flow chart based on directing output to destinations according to an example.

FIG. 5 is a flow chart 500 based on directing output to destinations according to an example. In block 510, a controller is to identify an ergonomic profile of a user account. For example, a user may log in to an account identified by the controller, to load various preferences of the user such as reach, destinations to be excluded, and other user preferences. In block 520, a subset of a plurality of finisher destinations corresponding to the ergonomic profile are determined. For example, the controller may cross-reference a user's personal preferences with physical hardware, by determining, e.g., which physically located destinations fall within a user's reach. Such information may be obtained by the controller based on accessing cross-reference hardware information regarding hardware dimensions and capabilities (e.g., by accessing an internal or online database, driver information from a hardware vendor, or other sources of hardware specifications including a manually configured hardware information database). In block 530, output is directed to the subset of the plurality of destinations. For example, the controller may determine that a user's ergonomic profile indicates the user cannot reach the highest destination of a particular finisher hardware, thereby locking out that destination for the user account. A physical indicator, such as a red light emitting diode (LED), may be activated on the locked out destination for easy visual reference by the user.

Figure 6:
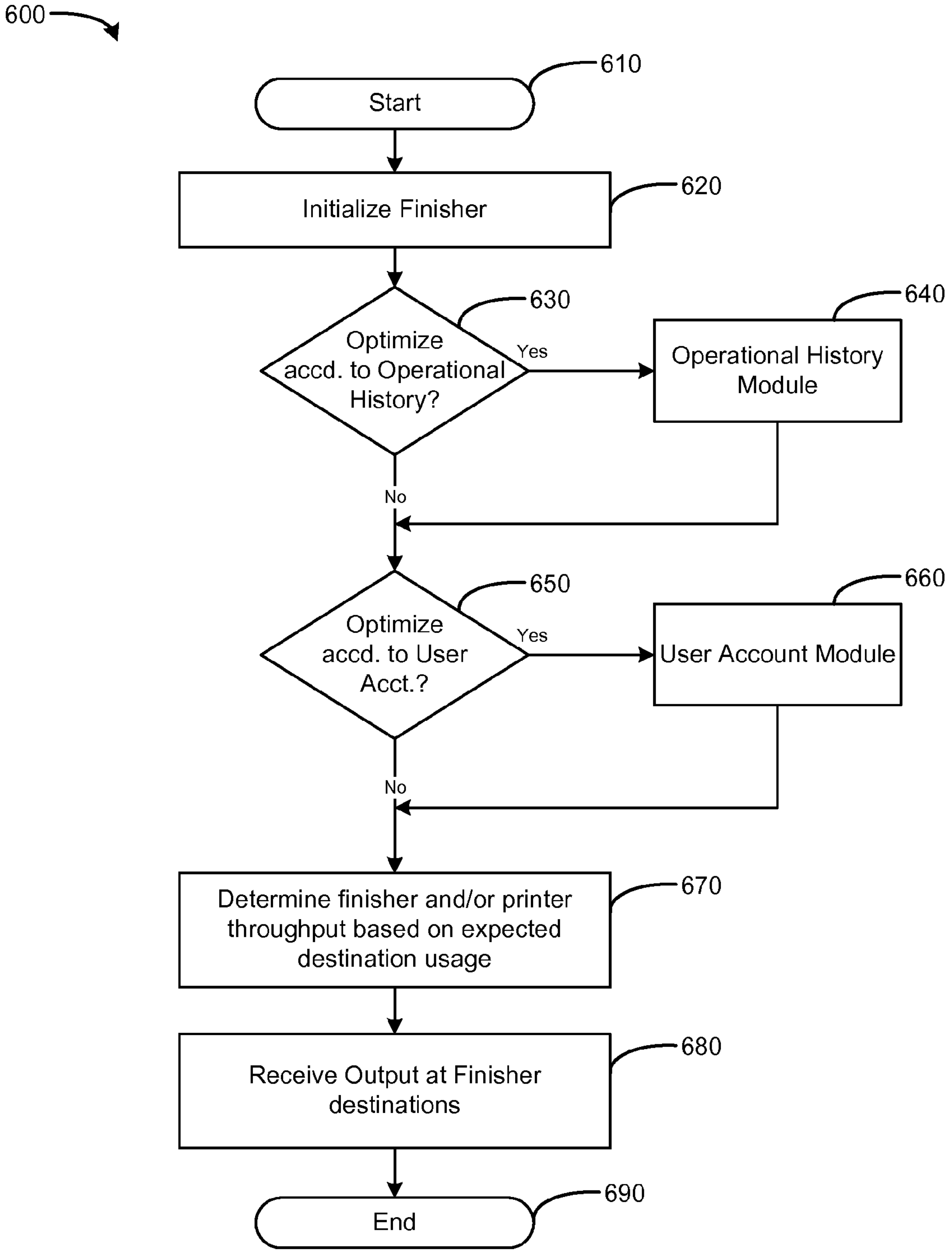
FIG. 6 is a flow chart based on directing output to destinations according to an operational history module and user account module according to an example.

FIG. 6 is a flow chart 600 based on directing output to destinations according to an operational history module and user account module according to an example. Flow starts at block 610. In block 620, a finisher is initialized. For example, a controller may identify characteristics of the finisher hardware, set the finisher spacing, throughput, and other characteristics to initial default values, and the finisher may be otherwise placed in a ready condition to receive output. In block 630, it is determined whether to optimize the finisher according to an operational history. For example, whether to direct output to destinations in view of how much usage a destination has accumulated, or other factors that take into account an operational history of the finisher. If yes, flow proceeds to block 640, to access an operational history module (see, e.g., FIG. 7). Following the operational history module, or if proceeding directly from block 630 to bypass the operational history module, flow proceeds to block 650. In block 650, it is determined whether to optimize according to a user account, for example customizing finisher behavior according to user preferences. If yes, flow proceeds to block 660, to access a user account module (see, e.g., FIG. 8). Following the user account module, or if proceeding directly from block 650 to bypass the user account module, flow proceeds to block 670. In block 670, finisher and/or printer throughput are determined based on expected destination usage (and other types of throughput may be determined, for the component in a system). For example, a reduced number of destinations may be in use, to reduce the total storage capacity of the finisher. With such reduced capacity, a controller may instruct a printer to reduce throughput, thereby ensuring that the printer doesn't overwhelm or fill to capacity the finisher destinations, which may result in stoppage of the printer and lost productivity during restart (e.g., compared to slowing throughput of the printer to avoid stoppage during a print run). In block 680, output is received at the finisher destinations. For example, output may be provided in a subset of the finisher destinations, and such destinations may include an indicator to identify them as being in use and/or occupied. Flow ends at block 690. As shown in the example of FIG. 6, the various modules may be optional, and examples herein enable a finisher to be used in a standard mode without specifically optimizing for operational history or user accounts, and examples enable the use of the user account module and customizations, even without using the operational history module.

Figure 7:
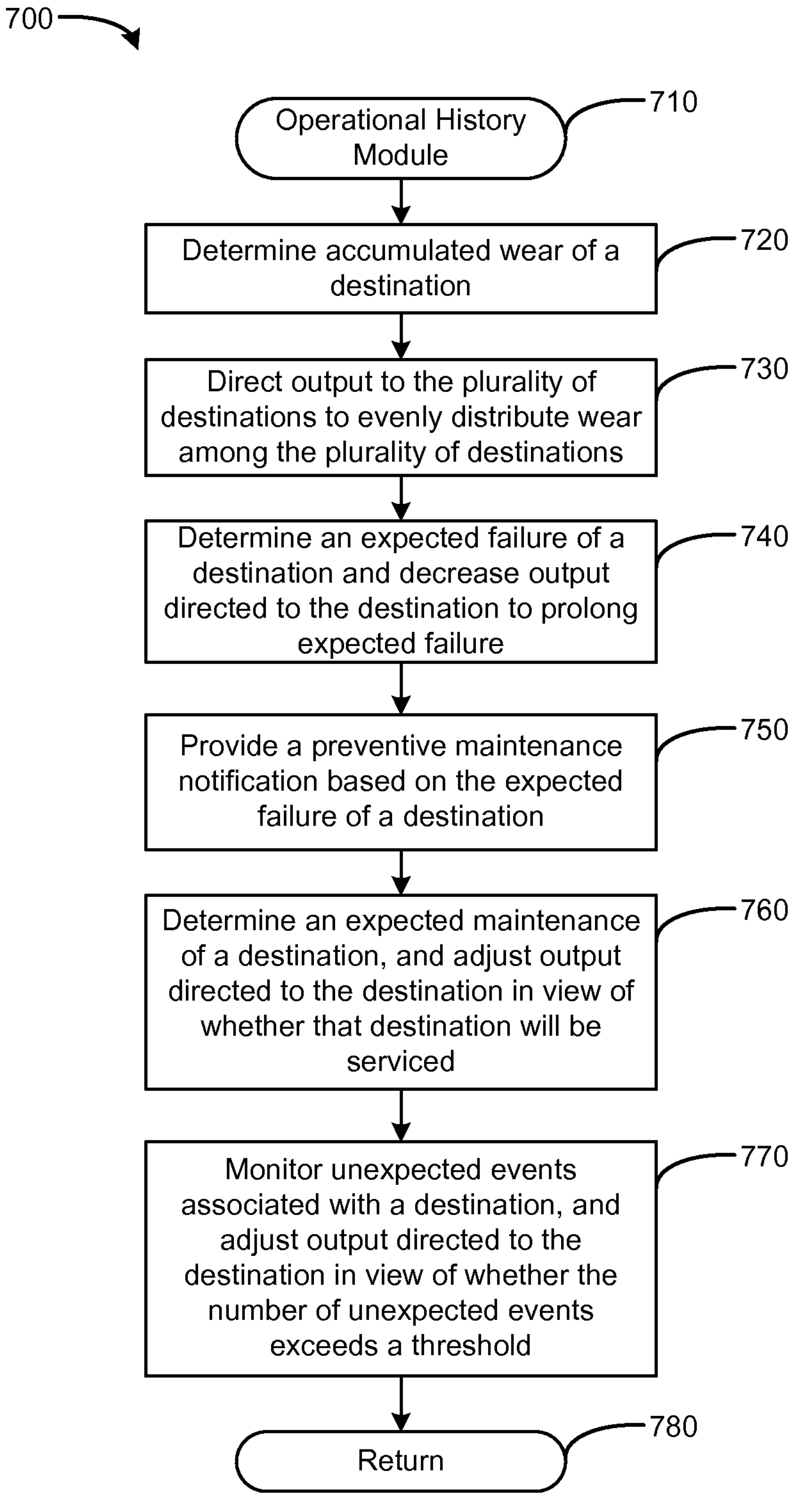
FIG. 7 is a flow chart based on an operational history module according to an example.

FIG. 7 is a flow chart 700 based on an operational history module according to an example. Flow begins at block 710. In block 720, accumulated wear of a destination is determined. For example, a controller may identify that a destination is being used, and increment a "usage" count (e.g., hours of operations) for that destination. Further, the type and/or intensity of a particular type of usage also may be indicated, which may be associated with a greater or lesser degree of accumulated wear depending on the intensity or other aspects of the destination usage. In block 730, output is directed to the plurality of destinations to evenly distribute wear among the plurality of destinations. For example, the controller may identify that a first destination has been overused, and a second destination has been underused, and use weighting to direct less output to the first destination and more output to the second destination. In block 740, an expected failure of a destination is determined, and output directed to the destination is decreased to prolong expected failure. For example, the controller may identify that a finisher destination has an expected mean time before failure (MTBF) rating, determine that accumulated usage of the destination is approaching the MTBF rating based on the operational history, and decrease output to that destination. The decrease may follow non-linear behavior, such as exponentially decreasing usage of the destination to zero as the accumulated usage approaches the MTBF rating. In block 750, a preventive maintenance notification is provided based on the expected failure of a destination. For example, the controller may anticipate that expected failure is approaching, and proactively provide a preventive maintenance notification to enable servicing to be scheduled before a hardware failure actually occurs. In block 760, an expected maintenance of a destination is determined, and output directed to the destination is adjusted in view of whether that destination will be serviced. For example, the controller may identify that maintenance for a destination is scheduled to occur in five days, e.g., to replace that destination. Accordingly, the controller may direct additional output to that destination, to reduce wear and tear on other destinations, and maximize wear on the destination that is going to be replaced during upcoming maintenance. The controller also may be less conservative in locking out that destination, because the scheduled maintenance may occur before a determined expected failure, enabling more liberal use of that destination in view of the expected maintenance. In block 770, unexpected events associated with a destination are monitored, and output directed to the destination is adjusted in view of whether the number of unexpected events exceeds a threshold. For example, the controller may identify repeated jamming events or other issues (e.g., intermittent recoverable failures), such as a media jam occurring three, six or other times within an hour. The controller may identify that the occurrence of such issues exceeds a threshold, and adjust usage of that destination (including locking it out or decreasing weighting). Flow ends at block 780.

Figure 8:
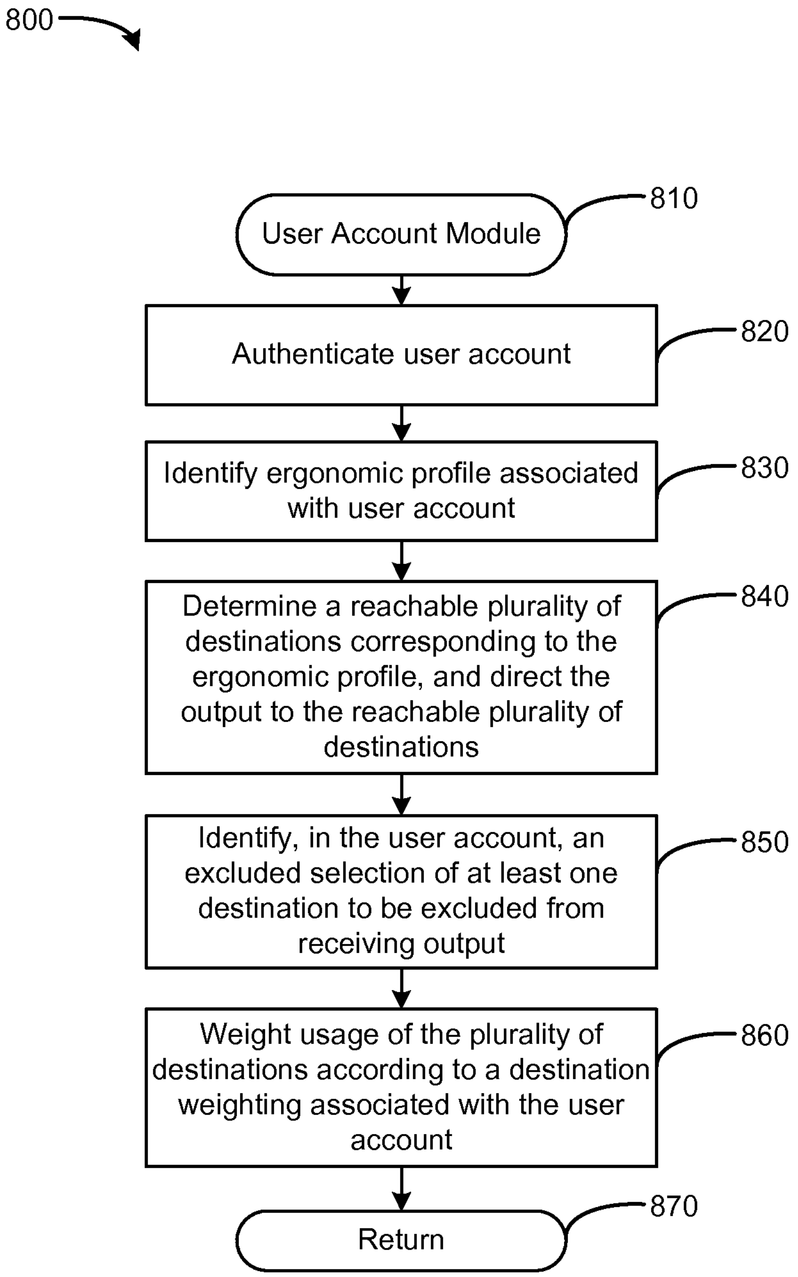
FIG. 8 is a flow chart based on a user account module according to an example.

FIG. 8 is a flow chart 800 based on a user account module according to an example. Flow begins at block 810. In block 820, a user account is authenticated. For example, a controller may accept an account login or other identification (e.g., radio frequency identification (RFID)), and may authenticate with or without a password based on configuration preferences. In block 830, an ergonomic profile associated with the user account is identified. For example, the controller may access stored information regarding ergonomics of a user account, such as reach limitations or whether a user is disabled, or other characteristics specific to a user. In block 840, a reachable plurality of destinations corresponding to the ergonomic profile are determined, and the output is directed to the reachable plurality of destinations. For example, the controller may identify the physical characteristics of a finisher and its destinations, and cross-reference that information with user-specific information, to determine which hardware is compatible with the user's ergonomics. In other words, a user does not need to be familiar with specifics on how to limit the specific hardware. Rather, a user may simply enter his or her own personal capability preferences that he or she is familiar with, and the controller will convert that information to be compatible with specific hardware limitations, if any. In block 850, an excluded selection in the user account, of at least one destination to be excluded from receiving output, is identified. For example, a user may enter into his or her account a selection of destinations to be locked out, and the controller may recognize those destinations to be excluded upon logging in that user account. In block 860, usage of the plurality of destinations may be weighted according to a destination weighting associated with the user account. For example, the user may identify some destinations that are preferred to be used more frequently, and/or some destinations that are preferred to be used less frequently, without needing to specifically lock out any destinations. Flow ends at block 870.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., a computing device) can include and/or receive a tangible non-transitory computer-readable medium storing a set of computer-readable instructions (e.g., software). As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A system comprising:

a finisher to receive output, wherein the finisher includes a plurality of destinations in which to store the output;

a controller to identify an operational history of the plurality of destinations including accumulated usage over time on a per-destination basis, and direct the output to the plurality of destinations based on the operational history;

wherein the controller is to direct the output to the plurality of destinations to evenly distribute wear among the plurality of destinations, in view of the operational history.

2. The system of claim 1, wherein the controller is to determine an expected failure of a destination, based on the operational history and an end-of-life (EOL) rating of the plurality of destinations, and adjust a proportion of the output directed to the destination to prolong functionality of the destination before expected failure.

3. The system of claim 2, wherein the controller is to provide a preventive maintenance notification based on the expected failure.

4. The system of claim 1, further comprising an indicator to indicate a notification corresponding to a destination status of the plurality of destinations.

5. The system of claim 4, wherein the indicator is a destination indicator located at a destination, to indicate a lockout notification for the destination, corresponding to an excluded status of the destination.

6. The system of claim 1, wherein the controller is to identify a user account, and direct the output to at least one of the plurality of destinations based on the user account.

7. The system of claim 6, wherein the user account includes an excluded selection of at least one destination, wherein the controller is to exclude the excluded selection from receiving output.

8. The system of claim 6, wherein the controller is to determine an adjusted finisher throughput, corresponding to adjusted usage by the user account of the plurality of destinations, and provide an instruction receivable by a printer indicating an adjusted print throughput corresponding to the adjusted finisher throughput, to avoid stoppage of the printer.

9. The system of claim 6, wherein the user account includes a customizable destination weighting, wherein the controller is to weight usage of the plurality of destinations according to the destination weighting.

10. The system of claim 6, wherein the user account includes an ergonomic profile, and the controller is to direct the output to the plurality of destinations that are compatible with the ergonomic profile.

11. The system of claim 10, wherein the ergonomic profile includes a reach capability based on at least one of an upper reach height and a lower reach height, wherein the controller is to determine a reachable plurality of destinations corresponding to the reach capability, and direct the output to the reachable plurality of destinations.

12. A system, comprising:

a printer to provide output;

a finisher to receive output from the printer, wherein the finisher includes a plurality of destinations in which to store the output; and a controller to identify an operational history of the plurality of destinations including accumulated usage over time on a per-destination basis, and direct the output to the plurality of destinations based on the operational history; wherein the controller is to adjust throughput for the printer and finisher based on an adjusted usage of the plurality of destinations;

wherein the controller is to direct the output to the plurality of destinations to evenly distribute wear among the plurality of destinations, in view of the operational history.

13. A method, comprising:

identifying, by a controller, an operational history of a plurality of finisher destinations to receive output, wherein the operational history includes accumulated usage over time on a per-destination basis; and directing the output to the plurality of destinations based on the operational history;

wherein the controller is to direct the output to the plurality of destinations to evenly distribute wear among the plurality of destinations, in view of the operational history.

14. The method of claim 13, further comprising:

identifying, by the controller, an ergonomic profile of a user account;

determining a subset of the plurality of destinations corresponding to the ergonomic profile; and directing the output to the subset of the plurality of destinations.

* * * * *